US007908759B2

(12) United States Patent
McLean et al.

(10) Patent No.: US 7,908,759 B2
(45) Date of Patent: Mar. 22, 2011

(54) METHOD FOR SCANNING THE SURFACE OF A WORKPIECE

(75) Inventors: Ian William McLean, Edinburgh (GB); Nicholas John Weston, Peebles (GB); Martin Simon Rees, Edinburgh (GB); Leo Christopher Somerville, St. Charles, IL (US)

(73) Assignee: Renishaw PLC, Wotton-under-Edge (GB)

( * ) Notice: Subject to any disclaimer, the term of this patent is extended or adjusted under 35 U.S.C. 154(b) by 561 days.

(21) Appl. No.: 11/919,062

(22) PCT Filed: Apr. 19, 2006

(86) PCT No.: PCT/US2006/014672
§ 371 (c)(1),
(2), (4) Date: Oct. 23, 2007

(87) PCT Pub. No.: WO2006/115923
PCT Pub. Date: Nov. 2, 2006

(65) Prior Publication Data
US 2009/0307916 A1    Dec. 17, 2009

(30) Foreign Application Priority Data
Apr. 25, 2005    (GB) .................................. 0508273.0

(51) Int. Cl.
*G01B 5/008*    (2006.01)
*G01B 5/20*    (2006.01)
*G01B 7/28*    (2006.01)
(52) U.S. Cl. ................. 33/554; 33/551; 33/556; 33/503; 702/95

(58) Field of Classification Search ............ 33/502–505, 33/551, 553, 554, 555; 702/94, 95, 150, 702/167, 168
See application file for complete search history.

(56) References Cited

U.S. PATENT DOCUMENTS

| 3,748,563 A | 7/1973 | Pomella et al. |
| 5,471,406 A | 11/1995 | Breyer et al. |
| 5,726,917 A | 3/1998 | Staaden |
| 5,895,444 A * | 4/1999 | Ruck et al. ..................... 702/168 |
| 5,936,864 A | 8/1999 | Otsuki et al. |

(Continued)

FOREIGN PATENT DOCUMENTS

DE    42 13 927 A1    11/2004

(Continued)

OTHER PUBLICATIONS

Ainsworth, I. et al., "CAD-Based Measurement Path Planning For Free-Form Shapes Using Contact Probes," The International Journal of Advanced Manufacturing Technology, vol. 16, No. 1, pp. 23-31, Jan. 2000.

*Primary Examiner* — Amy Cohen Johnson
(74) *Attorney, Agent, or Firm* — Oliff & Berridge, PLC

(57) ABSTRACT

A method for measuring a surface profile using a surface sensing device mounted on an articulating probe head in which the probe head is moved along a nominal path relative to the surface profile, an at least approximation of the surface normal of the surface profile, the surface profile is sensed with the surface sensing device and the distance or force of the surface sensing device relative to the surface profile substantially in the direction of the surface normal. The surface normal may be determined by approximating at least one section to a curved profile which can be mathematically parameterised.

20 Claims, 14 Drawing Sheets

U.S. PATENT DOCUMENTS

| | | | |
|---|---|---|---|
| 5,955,856 A | | 9/1999 | Sato et al. |
| 5,966,681 A | * | 10/1999 | Bernhardt et al. ............ 702/152 |
| 5,988,850 A | | 11/1999 | Kumiya |
| 6,154,713 A | | 11/2000 | Peter et al. |
| 6,591,208 B2 | * | 7/2003 | Lotze et al. .................... 702/95 |
| 6,701,278 B1 | | 3/2004 | Barg et al. |
| 6,901,677 B2 | * | 6/2005 | Smith et al. .................... 33/551 |
| 7,100,429 B2 | * | 9/2006 | Matsuki et al. ................ 73/105 |

FOREIGN PATENT DOCUMENTS

| | | |
|---|---|---|
| EP | 0 436 735 A1 | 1/1991 |
| WO | WO 90/07097 A1 | 6/1990 |

\* cited by examiner

Blended Parabolas

— Straight Segments
--- Arc Blends
······ Polynomial Blends

—— Nominal path & normal

— — Required path & normal

METHOD FOR SCANNING THE SURFACE OF A WORKPIECE

The present invention relates to a method of scanning the surface of a workpiece using a motorised scanning head mounted on a coordinate positioning apparatus such as a coordinate measuring machine (CMM), machine tool, manual coordinate measuring arm and inspection robot.

It is known from International Patent Application No. WO90/07097 to mount a motorised scanning head on a coordinate positioning machine. The motorised scanning head enables a stylus mounted on the motorised scanning head to be rotated about two orthogonal axes. Thus the stylus may be positioned angularly about these two axes whilst the motorised scanning head can be positioned by the coordinate positioning machine in any position within the working volume of the machine.

Such a motorised scanning head provides a coordinate positioning machine with greater scanning flexibility because the motorised scanning head can position the stylus in many different orientations.

A first aspect of the present invention provides a method for measuring a surface profile using a surface sensing device mounted on a probe head on a coordinate positioning apparatus, wherein the coordinate positioning apparatus may be operated to produce relative movement between the probe head and the surface profile and wherein the probe head includes a drive for producing rotational movement of the surface sensing probe about one or more axis, the method comprising the following steps, in any suitable order:
 (a) moving the probe head along a nominal path relative to the surface profile;
 (b) determining an at least approximation of the surface normal of the surface;
 (c) sensing the surface with the surface sensing device;
 (d) and adjusting the distance or force of the surface sensing device relative to the surface substantially in the direction of the surface normal.

The surface normal may be determined in step (b) by use of a 3D probe; use of historical data; from the defined geometry of the part; or from approximating a curved profile which can be mathematically parameterised.

The step of sensing the surface with the surface sensing device in step (c) may comprise transducing the deflection of a stylus of the probe, transducing the force at the stylus of the probe or transducing the distance of the surface from the probe.

A second aspect of the present invention provides apparatus for measuring a surface profile using a surface sensing device mounted on a probe head on a coordinate positioning apparatus, wherein the coordinate positioning apparatus may be operated to produce relative movement between the probe head and the surface profile and wherein the probe head includes a drive for producing rotational movement of the surface sensing probe about one or more axis, the apparatus comprising a controller for carrying out the following steps, in any suitable order:
 (a) moving the probe head along a nominal path relative to the surface profile;
 (b) determining an at least approximation of the surface normal of the surface;
 (c) sensing the surface with the surface sensing device;
 (d) and adjusting the distance or force of the surface sensing device relative to the surface substantially in the direction of the surface normal.

A third aspect of the present invention provides a method for measuring a surface profile using a surface sensing device mounted on a probe head on a coordinate positioning apparatus, wherein the coordinate positioning apparatus may be operated to produce relative movement between the probe head and the surface profile and wherein the probe head includes a drive for producing rotational movement of the surface sensing device about one or more axis, the method comprising the following steps, in any suitable order:
 (a) approximating at least one section of the surface profile to a curved profile which can be mathematically parameterised;
 (b) determining the surface normal of the curved profile;
 (c) measuring the surface of the at least one section of the surface profile with the measurement probe and wherein the distance or force reported by the surface sensing device is controlled in substantially the direction of the normal of the curved profile.

In a preferred embodiment, the curved profile comprises a parameterised parabola. Other curved profiles may be used, for example a non uniform rational b-spline (NURBS) surface.

The curved surface has defined height and width parameters.

The curved surface may have different height and width parameters at the start and end of a section, the height and width parameters being blended together between the two ends.

Two or more sections of the surface profile may be approximated to a corresponding number of curved profiles, with the measurement profile of the two or more curved profiles being blended together.

A fourth aspect of the present invention provides apparatus for measuring a surface profile using a surface sensing device mounted on a probe head on a coordinate positioning apparatus, wherein the coordinate positioning apparatus may be operated to produce relative movement between the probe head and the surface profile and wherein the probe head includes a drive for producing rotational movement of the surface sensing device about one or more axis, the apparatus comprising a controller for carrying out the following steps, in any suitable order:
 (a) approximating at least one section of the surface profile to a curved profile which can be mathematically parameterised;
 (b) determining the surface normal of the curved profile;
 (c) measuring the surface of the at least one section of the surface profile with the measurement probe and wherein the distance or force reported by the surface sensing device is controlled in substantially the direction of the normal of the curved profile.

A fifth aspect of the present invention provides a method for measuring a surface profile using a measurement probe with a surface sensing device mounted on a probe head on a coordinate positioning apparatus, wherein the coordinate positioning apparatus may be operated to produce relative movement between the probe head and the surface profile and wherein the probe head includes a drive for producing rotational movement of the surface sensing device about one or more axis, the method comprising the following steps, in any suitable order:
 (a) dividing the surface profile into at least two sections, the intersection of the two sections defining a way-point, the way-point having an associated radius;
 (b) determining the velocity of each axis when a point of interest enters the radius of the way-point;
 (c) determining the velocity of each axis when a point of interest exits the radius of the way-point;

(d) mathematically modelling the acceleration for a smooth transition from the velocity in step (b) to the velocity in step (c) in each axis.

The axes include the physical axes, i.e. those of the coordinate positioning apparatus and probe head. The axes may also include pseudo-axes, which comprise time varying parameters.

Point of interest may comprise the stylus tip.

In all the above aspects, the surface sensing device may comprise a contact probe with a deflectable stylus, in which transducers measure deflection of the stylus, a contact probe with a stylus in which transducers measure force at the stylus, or a non-contact probe such as a capacitance, inductance or optical probe, in which transducers measure the offset from the surface.

A sixth aspect of the present invention provides apparatus for measuring a surface profile using a measurement probe with a surface sensing device mounted on a probe head on a coordinate positioning apparatus, wherein the coordinate positioning apparatus may be operated to produce relative movement between the probe head and the surface profile and wherein the probe head includes a drive for producing rotational movement of the surface sensing device about one or more axis, the apparatus comprising a controller for carrying out the following steps, in any suitable order:
(a) dividing the surface profile into at least two sections, the intersection of the two sections defining a way-point, the way-point having an associated radius;
(b) determining the velocity of each axis when a point of interest enters the radius of the way-point;
(c) determining the velocity of each axis when a point of interest exits the radius of the way-point;
(d) mathematically modelling the acceleration for a smooth transition from the velocity in step (b) to the velocity in step (c) in each axis.

Examples of preferred embodiments of the invention will now be described with reference to the accompanying drawings wherein.

Figure 1:
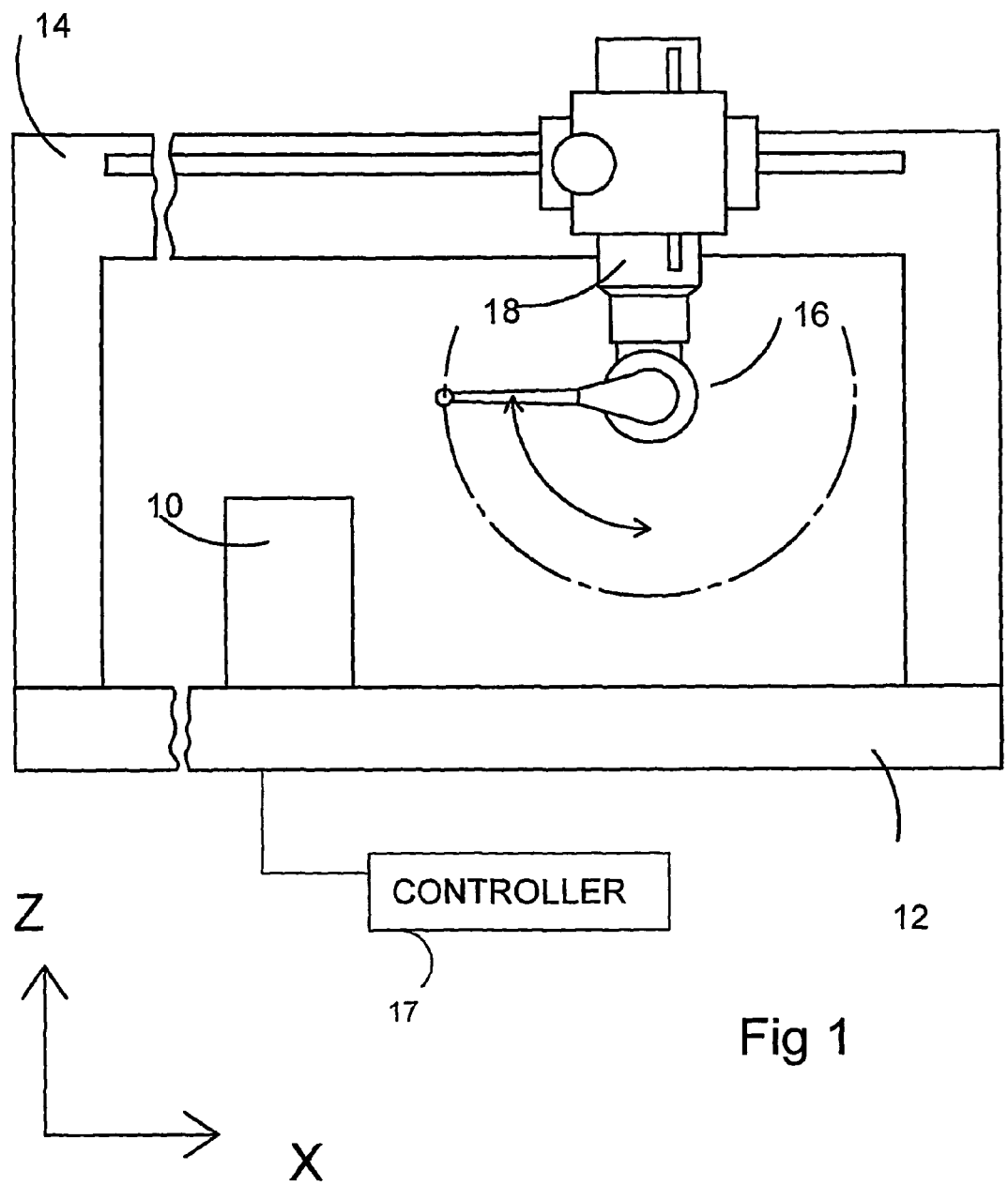
FIG. 1 is an elevation of a coordinate measuring machine including scanning apparatus according to the present invention.

FIG. 1 illustrates a motorised scanning head mounted on a coordinate measuring machine (CMM). A workpiece 10 to be measured is mounted on a table 12 of the CMM 14 and a motorised scanning head 16 is mounted on a spindle 18 of the CMM 14. The spindle is driveable in the directions X, Y, Z relative to the table by motors in a known manner.

Figure 2:
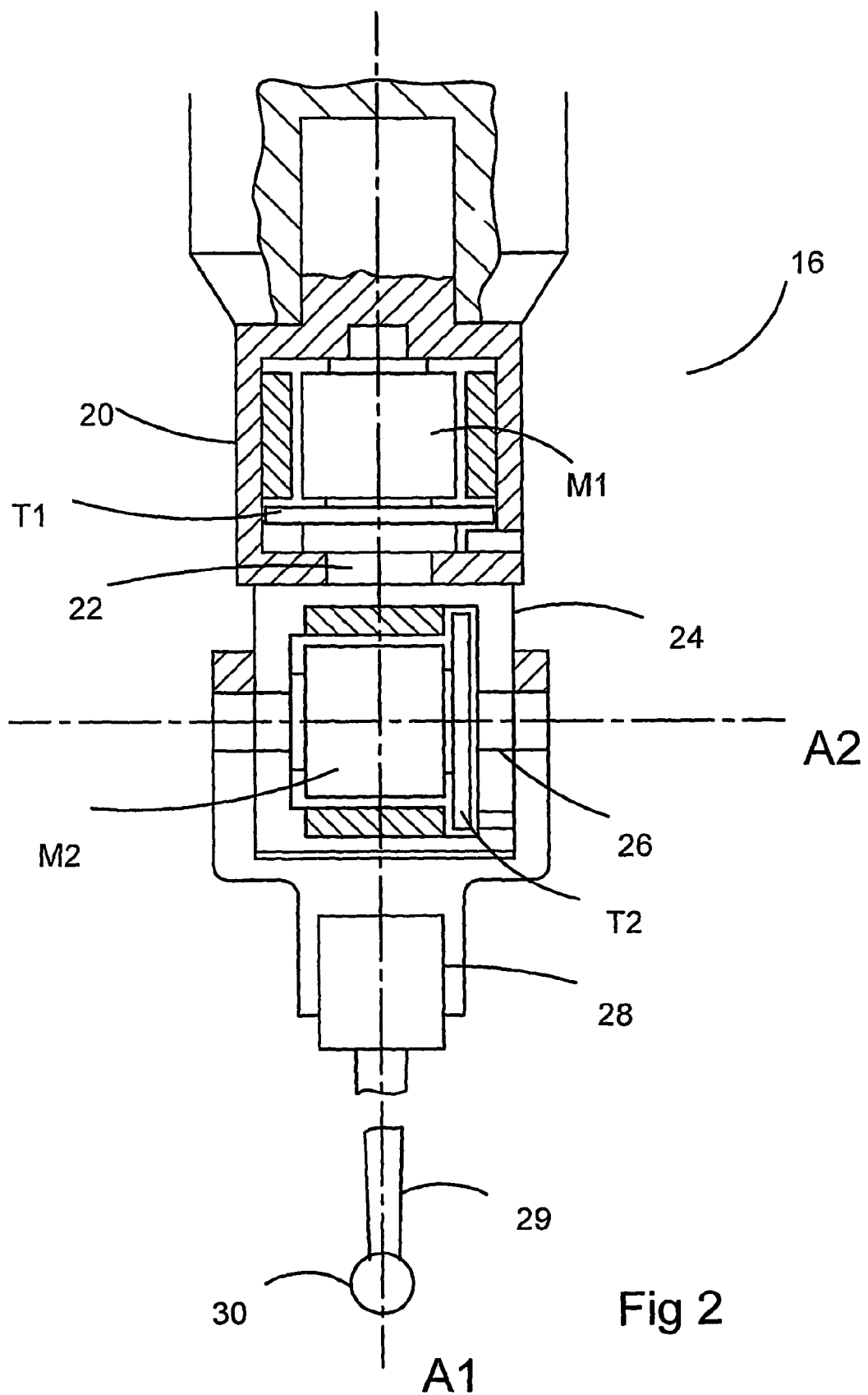
FIG. 2 is a cross-section of a motorised scanning head.

As illustrated in FIG. 2, the motorised scanning head 16 comprises a fixed part formed by a base or housing 20 supporting a movable part in the form of a shaft 22 rotatable by a motor M1 relative to the housing 20 about an axis A1. The shaft 22 is secured to a further housing 24 which in turn supports a shaft 26 rotatable by a motor M2 relative to the housing 24 about an axis A2 perpendicular to the axis A1.

A probe 28 with a stylus 29 having a workpiece contacting tip 30 is mounted onto the motorised scanning head. The arrangement is such that the motors M1,M2 of the head can position the workpiece-contacting tip angularly about the axes A1 or A2 and the motors of the CMM can position the motorised scanning head linearly anywhere within the three-dimensional coordinate framework of the CMM to bring the stylus tip into a predetermined relationship with the surface being scanned.

Linear position transducers are provided on the CMM for measuring linear displacement of the scanning head and angular position transducers T1 and T2 are provided in the scanning head for measuring angular displacement of the stylus about the respective axes A1 and A2. The probe has a deflectable stylus 29 and transducers in the probe measure the amount of stylus deflection.

On a vertical arm CMM as shown in FIG. 1, the A1 axis of the scanning head 16 is nominally parallel to the CMM Z axis (which is along the spindle 18). The scanning head may rotate the probe continuously about this axis. The A2 axis of the scanning head is orthogonal to its A1 axis.

The CMM is provided with a controller 17, such as a computer, which contains a program to cause the system to measure a surface of a workpiece at a plurality of points sufficient to take all the required dimensions and form of the workpiece for the inspection operation required. This or a different controller may be used to control the steps and calculations described below.

A part may be scanned by moving the motorised scanning head along a nominal path around the part and using feedback from the probe to adjust the scan parameters.

A scan of an unknown part requires a mechanical bandwidth which may be regarded as the rate of change in the shape of the surface away from the nominal path. This can be divided into two parts, deviations away from the nominal path that are within the probe range and deviations that are larger than the probe range. Both of these are dependent upon the speed the probe passes over the surface, i.e. the scanning speed.

The essential bandwidth requirements of the system are that the probe mechanical bandwidth must be greater than the bandwidth of the surface changes of interest that are within the probe range and the bandwidth of the machine's motion servo system must be greater than the bandwidth of the surface changes of interest that are larger than the probe range. The sum of the bandwidth required to follow the nominal part locus, and the bandwidth required to control gross probe deflection errors must be less that the bandwidth of the machine's motion servo system.

The scan is typically made up of the resultant of two vectors, a 'drive vector' which moves the probe tip along the scan and the 'deflection control vector' which is used to keep the probe in range. In order to keep the probe in range, the probe's deflection is increased or decreased and it is required to know in which direction to move in to control the deflection. Furthermore the system must have some servo bandwidth available to affect the required movement.

For surface changes having a bandwidth greater than the bandwidth of the scanning head, the probe deflection reacts to the surface change. For surface changes having a bandwidth to which the scanning head can react but the machine on which it is mounted cannot, then both the scanning head and probe react. For surface changes having a bandwidth which is within the machine's performance limits, the machine can be used to react to the surface change. However, it is advantageous to use the scanning head rather than the machine on which it is mounted to react to surface changes in order to avoid inertial deflections of the machine. Where the surface change is greater than the range of the scanning head, the movement of the machine can be used. By these means it is also possible to limit the accelerations of the different parts of the system based on the known inertial deflection characteristics of each axis, such that the best speed can be achieved for a given required accuracy.

Although the examples describe a probe with a deflectable stylus which measure deflection of the stylus, this invention is suitable for other types of probes. Some contact probes measure force at the stylus rather than deflection. These have a force range and feedback from the probe is used to move the probe to keep the force at the stylus within range along a 'force control vector' which is analogous to the 'deflection control vector'. Non contact probes, such as capacitance, inductance and optical probes measure the distance from the surface and have an offset range. Feedback from the probe is used to adjust the probe's offset along an 'offset control vector' which is analogous to the 'deflection control vector'.

There are a number of ways of arriving at the deflection control vector, some of which are outlined below. The most efficient direction to control the deflection is along the normal to the surface being scanned.

A 3D probe should be expected to produce a deflection in a direction normal to the surface being measured. A typical 3D probe has a spherical stylus tip supported on a three axis spring system with the springs having equal stiffness. Thus the probe deflection should be in a direction normal to the surface. However, there are several factors which effect the direction of probe deflection.

Friction occurs between the sphere and the surface. As the deflection vector is the sum of the friction vector and the reaction force, the deflection vector is no longer normal to the surface. Furthermore, the friction between the surface and the sphere is not constant or linear as the stylus tip can stick and slip as it moves over the surface. Therefore, the deflection vector is not necessarily at a constant angle to the surface normal.

Additionally, if the probe does not have equal spring stiffness in all directions, then even in the absence of friction, the probe may not deflect along the surface normal.

The problem of friction can generally be neglected as introducing only a small error. If this error becomes large, the deflection vector can be rotated by the friction angle (the angle by which the reaction vector is rotated by the friction vector) to produce a better estimate of the surface normal.

The problem of stick and slip can be overcome by filtering the probe deflection data. This can be achieved by the use of a mechanical damper, electronic filter or software digital filter. All of these limit the bandwidth of the system and introduce lag to a greater or lesser extent.

Unequal spring stiffness can be compensated for mathematically but with the result that the deflection vector tends to more susceptible to noise in the stiffest axis direction.

These problems considerably limit the bandwidth of the surfaces that can be successfully scanned using this method but it has the advantage that very little needs to be known about the surface to perform a scan.

Figure 18:
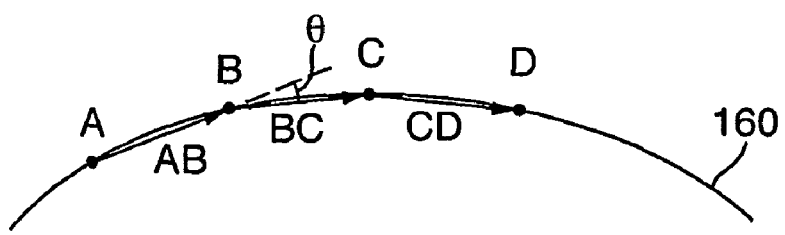
FIG. 18 illustrates the prediction of a surface nominal using historical data.

Historical data can be used to predict the form of the surface from past measurement points. A set of measurement data is used to calculate the form of the surface in the area containing those data points and to project that form to predict where the surface of the next target point may be. FIG. 18 Illustrates an unknown surface 160 and A, B, C, D are measurement points. Once A, B and C have been measured, the tangent AB connecting measurement points A and B can be determined. Likewise tangent BC can be determined. The angle θ between tangents AB and BC can also be determined. If the form of the unknown part is assumed to continue, then the tangent CD to unknown point D can be predicted from the past data, i.e. it will be BC rot θ. The surface normal at point D can be predicted by rotating the tangent CD by 90°. Deflection of the probe may therefore be adjusted along this direction.

Other methods may be used to extrapolate forward such as fitting a mathematical curve to the historical data. However this is more time consuming and thus not as practical.

In defined geometry scanning the surface form is known, for example it may be a cylinder or a plane. Measurement data acquired during the scan may be used to refine the geometric model as the part is scanned. This has the effect of reducing the likely low bandwidth errors. This can result in the scan being possible within the probe's deflection range. Thus the machine positioning servo bandwidth can be used to trace the nominal scan locus and none will be required to control gross probe deflection errors. This enables very high speed scans to be achieved.

In defined geometry scanning the normal to the surface is known and so the probe may easily be served in this direction to adjust deflection. For example, in a plane the normal is constant and in a cylinder the surface normal must always pass through the cylinder's axis.

Hybrid methods can be used where knowledge of the surface is initially too imperfect for historical, defined geometry or defined normal scans. In this case a scan may start with the deflection control vector estimated from a deflection vector. Once enough information about the surface is obtained, the deflection control vector can be established by the historical points, defined geometry or defined normal. This might be a sudden change from one method to the other or a gradual change as the influence of the 3D deflection vector is reduced and the influence of the method replacing it is increased over time, in order to remove sudden discontinuities.

One method of defining the surface normal of a surface will now be described in more detail. In this method the surface is approximated to a parameterised curve. The normal of the parameterised curve can then be determined and used as the direction of the deflection control vector.

Figure 3:
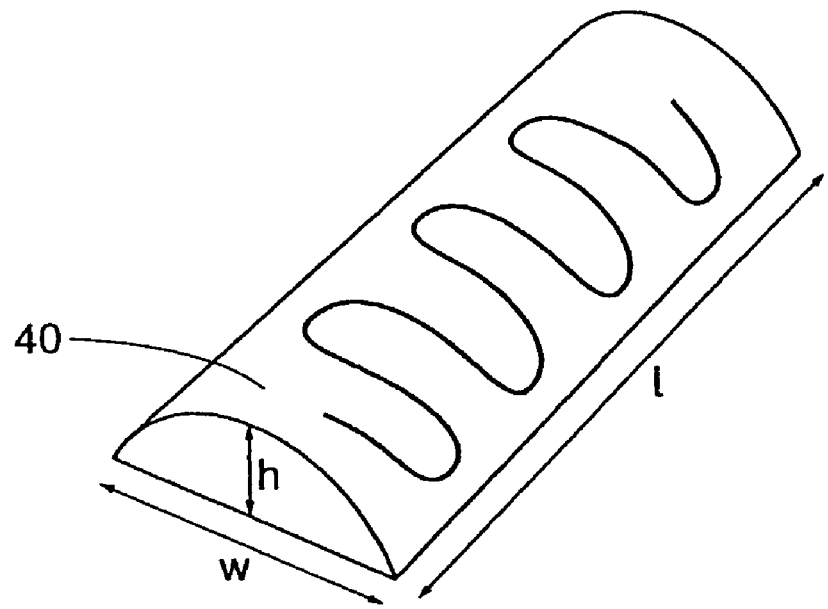
FIG. 3 illustrates a single segment sweep scan of fixed width and height.

As illustrated in FIG. 3, the surface 40 to be measured may be approximated to a parabola (or other surface profiles to be described later). The surface is approximated to a parabola of finite extent, which is defined by its width w and height h. The parabola in FIG. 3 has a constant width and zero height.

Once a parameterised parabolic profile has been created, then the excursion of the probe from the centre line of the scan, both in terms of width and height, can be determined from the amplitude a of the sweep at a given distance 1 along the scan.

The function of the parabola is to define the surface the axes A1 and A2 move towards or away from to control probe deflection (i.e. to correct over or under deflection). As the probe is not required to follow the parabolic profile, this profile may be used to scan surfaces that are only approximately parabolic.

Figure 4:
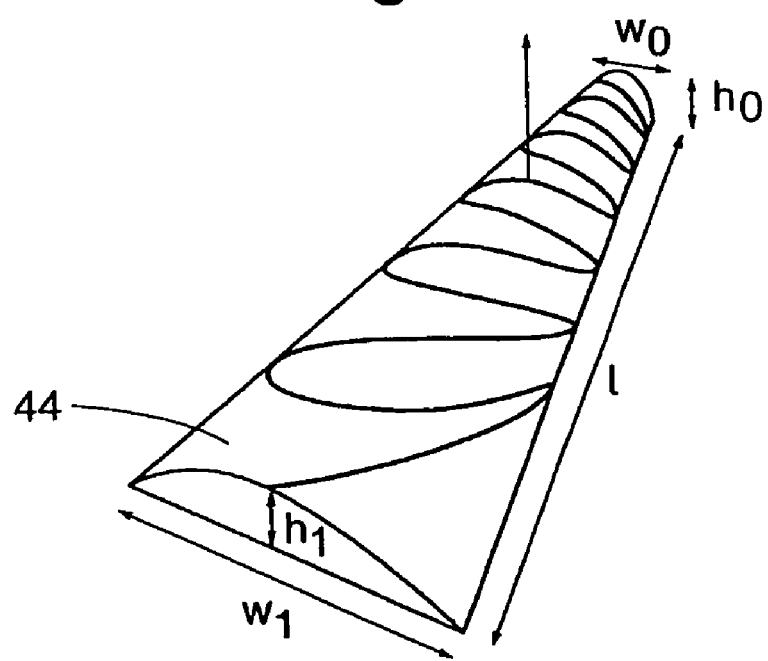
FIG. 4 illustrates a sweep scan with different start and end widths and heights.

As illustrated in FIG. 4, it is possible for the parabola 44 to have different height parameters h0,h1 and width parameters w0,w1 at the start and end of the segment, and these are merged smoothly between the two ends. Thus the parameter method may be used for surfaces which are non uniform along their lengths.

The parabolic profile will now be described in more detail with reference to FIG. 5. The parabolic profile has a useful mathematical property in that for parabolas with different heights and widths, parameterised in the same way, the lines joining points with the same parameter value are straight throughout the merge. This simplifies the calculations required.

Figure 5:
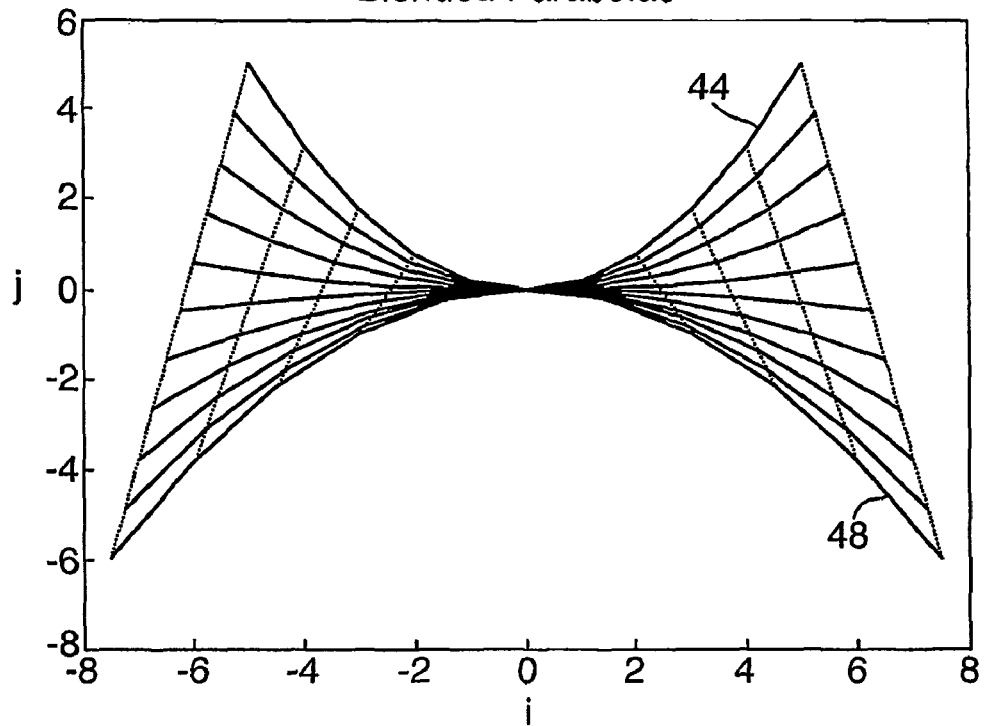
FIG. 5 is a graph showing two blended parabolas.

FIG. 5 is a graph of i, the width dimension of the scan against j, the height dimension of the scan. Two parabolas 44,48 with different heights and widths are illustrated. The dashed lines join points with the same parameter value.

The parameterisation used for a section is as follows:
If we define the co-ordinate system of the scan as being
i: the width dimension of the scan with zero at the centre of the sweep
j: the height dimension of the scan with zero at the centre of the sweep
k: the length dimension of the scan with zero at the start of the scan
If we define the variables as follows:
$W_0$: the width of the parabola at the start of the scan
$W_1$: the width of the parabola at the end of the scan
$H_0$: the height of the parabola at the start of the scan
$H_1$: the height of the parabola at the end of the scan
L: the length of the scan
w(k): the width of the parabola at length k along the scan
h(k): the height of the parabola at length k along the scan
t: a parameter that defines a point on the parabola
A(k): a parameter that defines the shape of the parabola
T(k): a parameter that defines the extent of the parabola
The shape of the surface which defines the normal of the scan is therefore defined by the following:

$$0 \leq k \leq L \quad (1)$$
$$w(k) = \frac{W_1 - W_0}{L} \cdot k + W_0$$
$$h(k) = \frac{H_1 - H_0}{L} \cdot k + H_0$$
$$A(k) = \frac{w(k)^2}{16 \cdot h(k)}$$
$$T(k) = \frac{4 \cdot h(k)}{w(k)}$$
$$-T(k) \leq t \leq T(k)$$
$$i(t, k) = 2 \cdot A(k) \cdot t \quad (2)$$
$$j(t, k) = -A(k) \cdot t^2 \quad (3)$$

Equations 2, 3 and 1 define the i, j and k co-ordinates of a surface, and deflection is controlled by moving normal to it.

The nominal scan path of the probe tip may be calculated by superimposing a wave over this surface. The phase of the wave is proportional to the distance traveled along the length of the scan and the parameter t is proportional to the sine of the phase, within the bounds of ±T. Mathematically this can be represented as follows:
Ω: is a measure of the frequency of the sweep
θ(k): is the phase of the sweep at length k along the scan
Therefore:

$$\theta(k) = k \cdot \Omega$$

$$t(k) = T(k) \cdot \sin\theta$$

These equations satisfy the criteria: $-T(k) \leq t \leq T(k)$

Since t is now a function of k only, i and j can also be defined purely in terms of k. The equations defining the nominal tip motion are therefore:

$$0 \leq k \leq L \quad 1$$
$$i(k) = 2 \cdot A(k) \cdot T(k) \cdot \sin(k \cdot \Omega) \quad 4$$
$$j(k) = -A(k) \cdot (T(k) \cdot \sin(k \cdot \Omega))^2 \quad 5$$

As there is only one variable this defines a line (the nominal tip locus) rather than a surface.

This system of equations represents a sinusoid superimposed on a parabola with a width and height that merge from start conditions to potentially different end conditions.

To trace this profile exactly would require considerable reciprocating motion along the locus the CMM traces. To eliminate the reciprocating motion in the CMM locus, the sinusoid is distorted towards the centre of rotation of the head like a shark's tooth. This is achieved by modifying parameter k.

The parabola parameters may be defined in a variety of ways, for example from a CAD model or by taking a set of initial measurements.

The key parameter of the sweep are the centre, height and width at each end of a scan segment and normal, along with the start and end A1 and A2 angle positions.

When programming from a CAD model, the process of finding these values can be accomplished in a variety of ways. A convenient method is described below.

Figure 6:
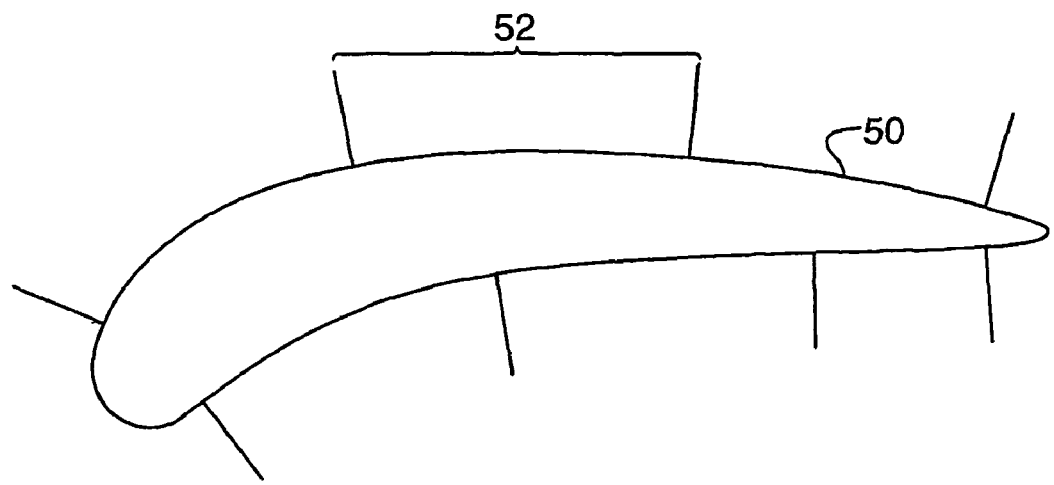
FIG. 6 illustrates a plan view of a planar curve of an aerofoil divided into regions.

A planar section is taken of the part at a first value of z. The resulting planar curve 50 is divided up into regions of interest 52, as illustrated in FIG. 6. These regions are no wider than a predetermined fraction of the probe length, for example a third of the probe length. However, if distortion of the sinusoidal scan is undesirable and the time taken to complete the scan is not critical, then narrower sections may be used.

The regions are selected so that each region curves in only one direction, so that they approximate a parabola as closely as possible. It may be required to choose points of inflection as the boundaries to ensure the correct curvature of the regions.

In this example, each section is scanned from top to bottom (or vice versa) in turn.

Figure 7:
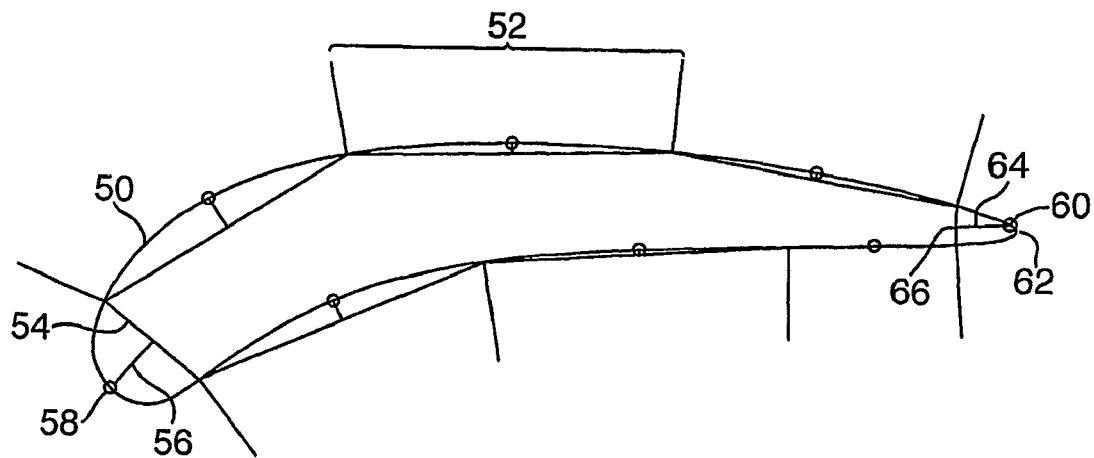
FIG. 7 illustrates the planar curve of FIG. 6 with added chords and bisectors for each region.

As illustrated in FIG. 7, each of the regions 52 is joined by a chord 54. A perpendicular bisector 56 extends from the chord 54 to the planar curve 50. The height of each scan is the length of the perpendicular bisector 56 and the width is the length of the chord 54. The center of the scan 58 is the point where the bisector meets the planar curve. The scan normal is along the direction of the bisector, from the chord to the curve.

The parabola parameters may be adjusted so that they approximate the part as closely as possible. In FIG. 7, the centre 60 of the region on the right is not sufficiently close to the peak 62 of the curve 50 and so can be modified, with the adjacent regions adjusted correspondingly.

Figure 8:
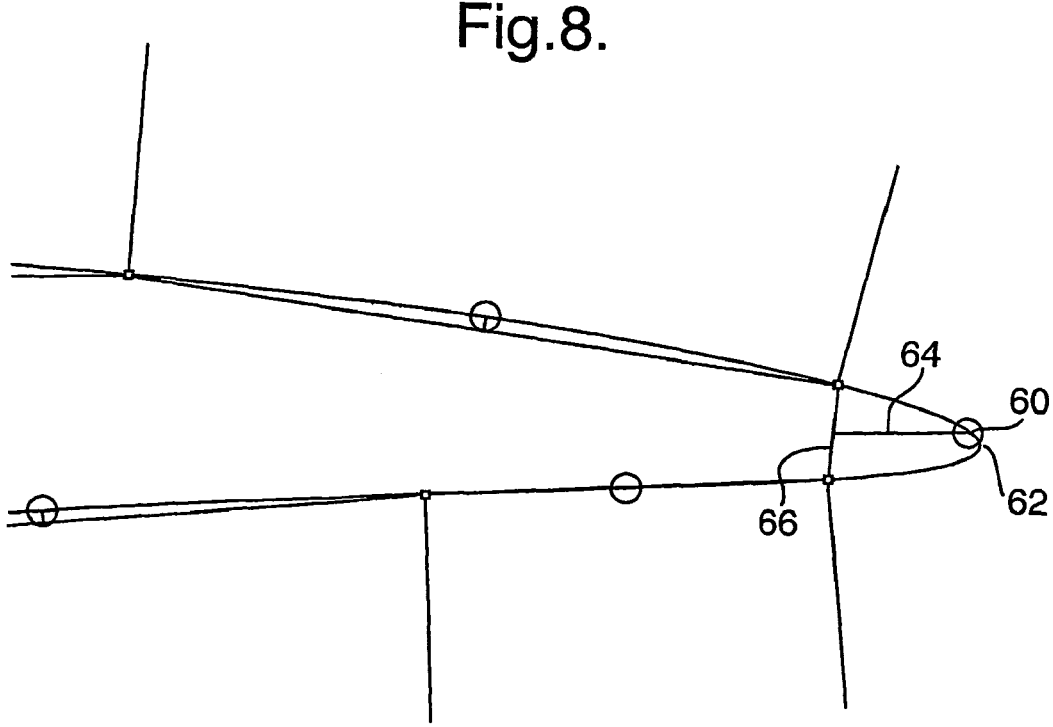
FIG. 8 illustrates a corrected sharp peak centre for a region of the planar curve of FIG. 6.

To modify the parabola, the bisector 64 is extended so that it crosses the planar curve 50. The bisector 64 and chord 66 are rotated about the midpoint of the chord until the extended bisector 64 passes through the peak 62 of the planar curve 50. The bisector 64 is trimmed so that it finishes at the planar curve 50 and the chord 66 is extended or trimmed so that this also finishes at the planar curve 50. The corrected sharp peak is shown in FIG. 8.

The chords and bisectors of the adjacent curves are adjusted and their centres moved appropriately. This ensures that the sharp peak can be successfully scanned.

The parabolas may be defined manually on a CMM, by using a joystick to identify the regions. A part co-ordinate system is set up in the plane of the scan. The control software may be used to restrict the motion of the sensing tip to the plane of the planar curve, by means of an "axis lock" in the part co-ordinate system. The joystick is used to take touch points on the part at the boundary of each region within one plane. The operator can then move clear of the part and the CMM can move onto the bisector of each chord in turn, and optionally use the control software to restrict motion to the line of the bisector by means of setting a second "axis lock" in the part co-ordinate system. In this way the operator is guided to take an accurate touch point for the centre point. From these three touch points all the required geometry for the scan is known. The appropriate A1 and A2 axis orientations can then be set using the joystick or by entering values.

If the operator is required to set up a sharp peak, the CMM can perform an unknown part scan along the line joining the two joystick points at each end of the region of interest. This will give an accurate peak for the centre, and new start and end points for the region, from which the geometry for the adjacent regions can be re-calculated.

Using the parabolas method of defining a surface normal, it is possible to encounter the following problem.

When the ratio of height to width of the parabola is low, defining the centre of the scan is not too critical. The surface normal might be inaccurate but moving the probe along it will still reduce or increase probe deflection in the sense anticipated, even if the probe must be moved a little further than expected.

When the ratio of height to width is high and the centre is defined inaccurately, then moving the probe along the normal in the direction expected to reduce the deflection may actually increase the deflection and vice versa.

Figure 17:
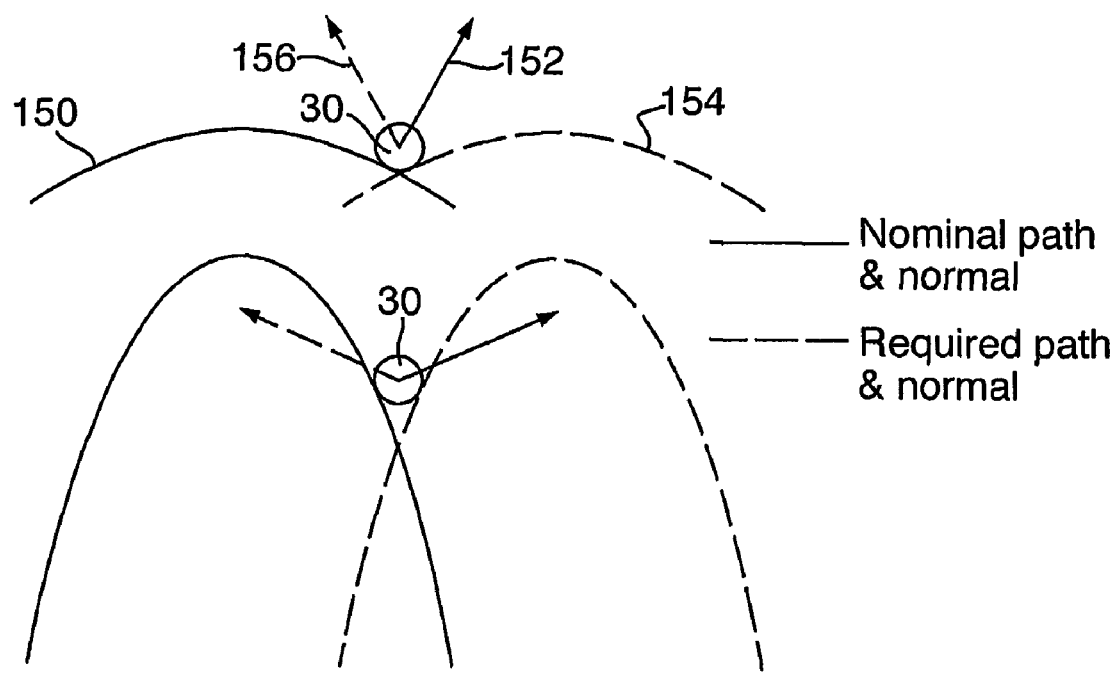
FIG. 17 illustrates the difference between the nominal and required scan path and normal.

In FIG. 17 the solid line refers to the nominal path 150 and normal 152 and the dashed line refers to the required path 154 and normal 156. It can be seen that for the case where the ratio of height to width of the parabola is low, the angle between the nominal normal and required normal is small. However, where the ratio of height to width of the parabola is high, the angle between the nominal normal and required normal is large.

A method for determining the required accuracy with which we need to know the position of the centre line is described below.

It is sensible to keep the nominal normal within about 20° of the prescribed normal (this might vary for different probes and surfaces). This corresponds to a gradient of roughly 1 in 3. It can be shown that the gradient of the parabola for a given co-ordinate is:

$$\frac{dj}{di} = \frac{H}{W^2} \cdot 8 \cdot i$$

The height and width might be different along the length of the scan but it is safe to use the values for whichever end has the greatest value for $H/W^2$. The acceptable centre error E can be calculated from:

$$\frac{1}{3} = \max\left(\frac{H}{W^2}\right) \cdot 8 \cdot E$$

$$E = \min\left(\frac{W^2}{H}\right) \cdot \frac{1}{24}$$

For a typical trailing edge of a blade, which might require a minimum width of 1 mm and a maximum height of 4 mm, measured with a 4 mm diameter probe, the allowable error can be roughly calculated as follows:

$$\text{sweep width} \approx \text{edge width} + \text{probe diameter} = 5 \text{ mm}$$

$$\text{sweep height} \approx \text{edge height} + \frac{\text{probe diameter}}{2} = 6 \text{ mm}$$

$$E \approx \pm\left(\frac{5^2}{6}\right) \cdot \frac{1}{24} \text{ mm}$$

$$E \approx \pm 0.18 \text{ mm}$$

The margin for error increases with probe tip size.

The centre of the edge needs to be located to better than $\frac{1}{3}^{rd}$ of a millimetre. The simplest way to do this is to run an unknown path scan perpendicular to the axis of the edge at a number of heights (depending on how curved the blade is known to be). The centre line of the scan can then be set to the centre of each bump found.

The set-up for the start of each unknown part scan could be performed either interactively with a joystick, or by picking clearance distances and search vectors from a CAD model.

Other mathematically parameterised curved profiles may be used in place of a parabola, for example a non uniform rational b-spline (NURBS) surface.

More complex parts may be measured by dividing the surface into segments and blending the scans for each segment together.

Figure 9:
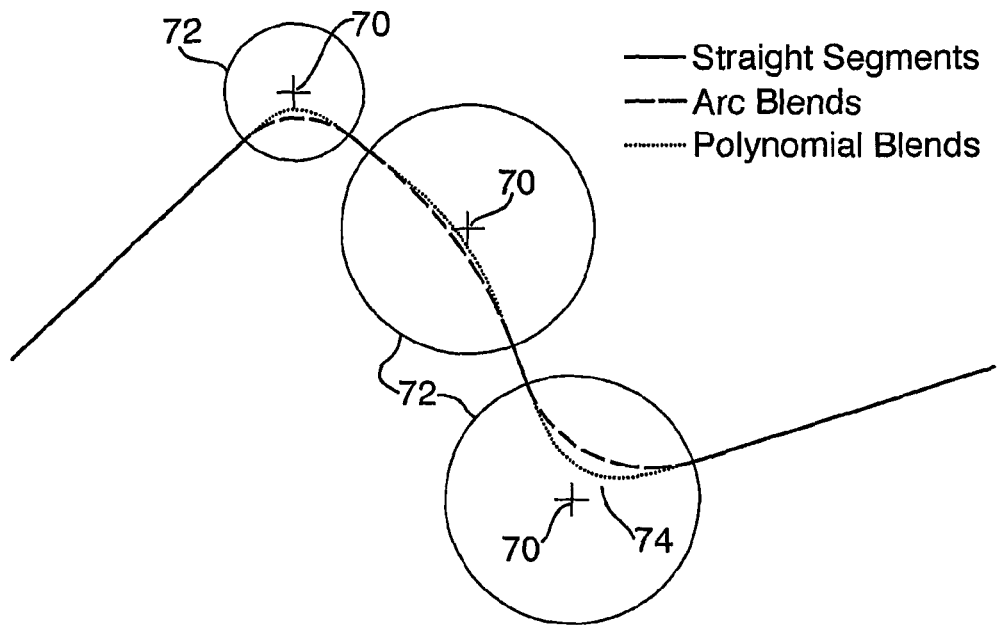
FIG. 9 illustrates a way-point and its associated blend radius.

A previous method of blending 3 axis systems (i.e. a probe mounted on a CMM) entails tracing an arc which is tangential to the incoming and outgoing probe movement vectors, as illustrated by the dashed line in FIG. 9. However, this method of using a geometric form to blend one constant set of axis motions with another is not suitable with system with more axes to be blended. The present system has three axes in the CMM and two axes in the motorised scanning head.

In the present invention, the part is divided into segments by creating way-points 70 on the surface, each way-point having a blend radius 72 associated with it, as illustrated in FIG. 9. The machine enters the blend radius having the speed and direction required in the previous segment. Once it has entered the blend radius, it starts progressively changing its speed and direction so that when it leaves the radius it has the correct trajectory and appropriate speed for the next segment.

The blend radius smoothes the acceleration in each axis, using a parabolic or quadratic equation. It thus smoothes the motion of the system.

The aim of blending straight segments is to get from one velocity to another, in each individual axis, as smoothly as possible. Each axis is taken in isolation and a polynomial is used to model the acceleration required to get from the velocity the axis has at the moment the stylus tip (or other point of interest) enters the blend radius, to the velocity it must have when the stylus tip (or other point of interest) leaves the blend radius. This technique enables smooth transition from one move vector to another to be achieved for multiple axis systems (such as the five axis system described) and allows the type of axes and their configuration to be ignored. For the general case of an N-axis system, a $3^{rd}$ order polynomial is required. However it is straightforward to shrink the insignificant terms to recover a physical 3-axis radius. Furthermore, when blending 'straight' segments together (i.e. segments where the velocity of every axis is constant) a second order polynomial can be used.

The point of interest may be the stylus tip of a measurement probe, which may for example have a deflectable or rigid stylus. Alternatively, a non contact probe may be used, in which case the point of interest is the position of the measuring apparatus of the probe offset by a constant length vector whose position and orientation is fixed with respect to the probe. This is required to keep the probe within its measuring range. The constant length vector is fixed in position and orientation with respect to the probe. This could be the stand-off between the objective lens of an optical probe and the surface which keeps the probe in range, aligned with the optical axis of the probe.

As shown in FIG. 9, the polynomial blends shown by dotted line 74 closely approach the way-points. However, the method of calculating the polynomial blend reduces the jerk (derivative of acceleration with respect to time) undergone by each axis at the start and end of each blend. A machine will have a limit on the jerk it can withstand and as jerk is proportional to acceleration, the polynomial blended moves have that advantage that high accelerations are possible whilst staying within a machine's jerk limit.

Another advantage of this mathematical method of blending is that elements of moves can be treated as pseudo-axes. For example, in the case of sweep scanning a parabola, width, height and phase are treated as pseudo-axes. This enables width, height and phase to be smoothly blended from one move to the next. The same principle applies for all other time varying parameters of a machine's behaviour.

FIGS. 10-13 illustrate scans of different shapes which are in a single plane and (and thus the normal is constant).

Figure 10:
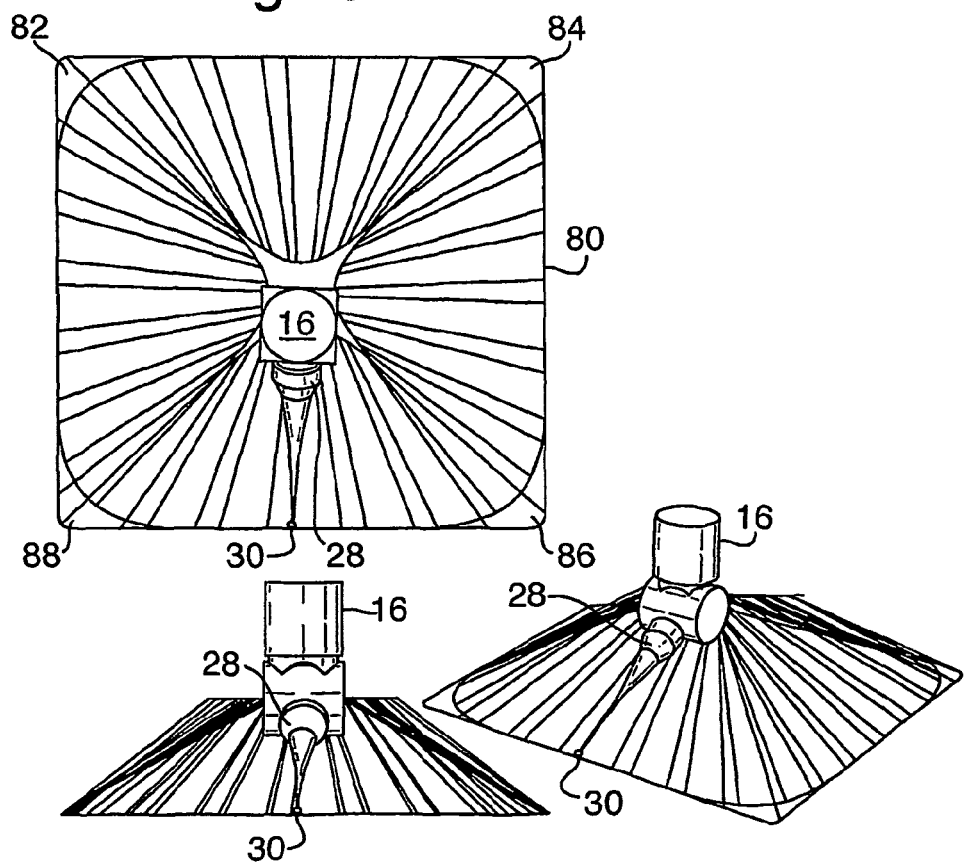
FIG. 10 illustrates a square scanned using blended moves.

FIG. 10 illustrates a simple scan of a square 80 which has four way-points 82,84,86,88 (at the four corners) defining four parabolic segments of zero width and height (forming the four sides). The probe 28 is nominally aligned normal to the direction of the CMM's movement, to minimise the movement required by the CMM. A square is followed by the probe tip 30 as the A1 axis rotates by 90 degrees along each side so that the probe bisects the internal angle of the square at each corner.

Figure 11:
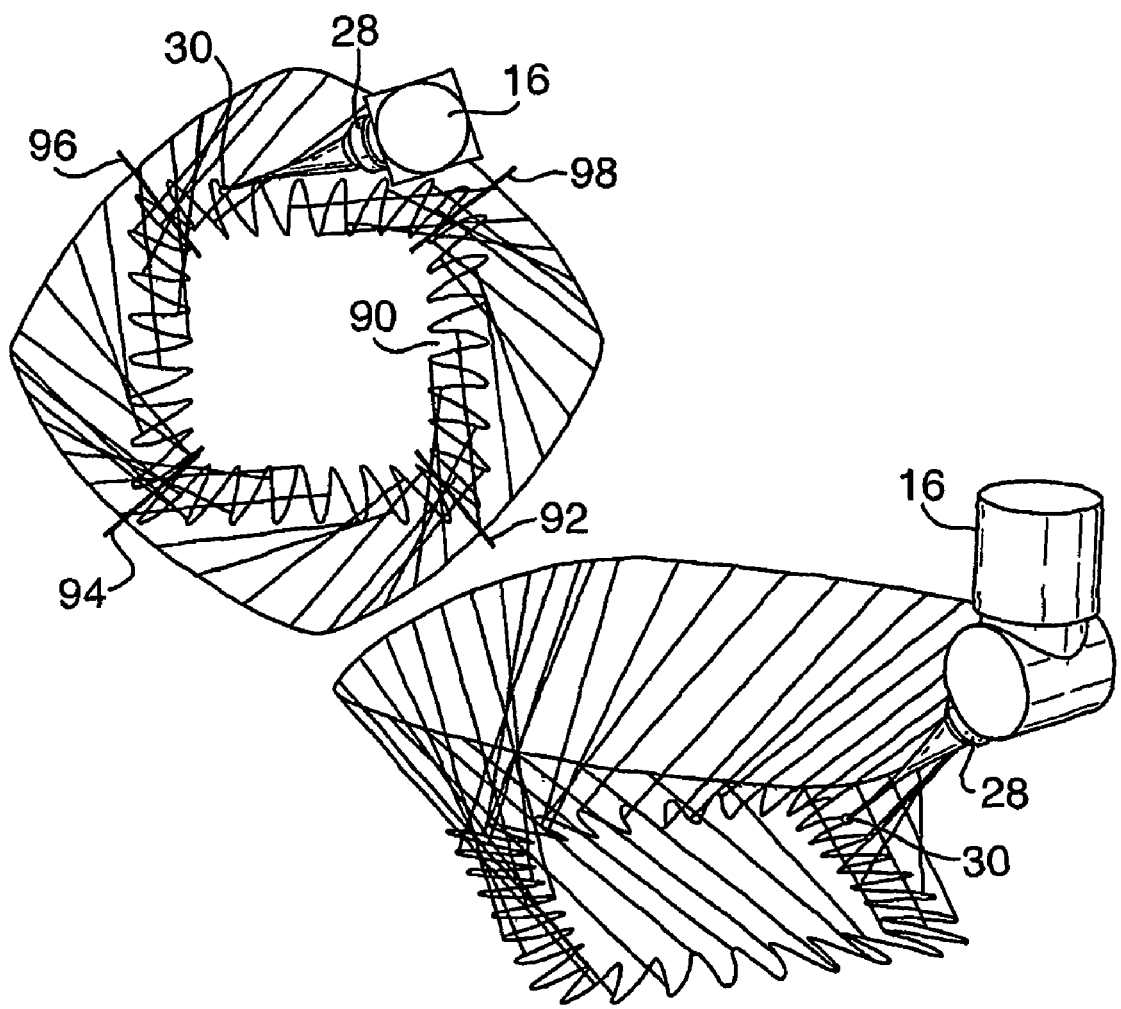
FIG. 11 illustrates a blended sweep of a square.
Figure 12:
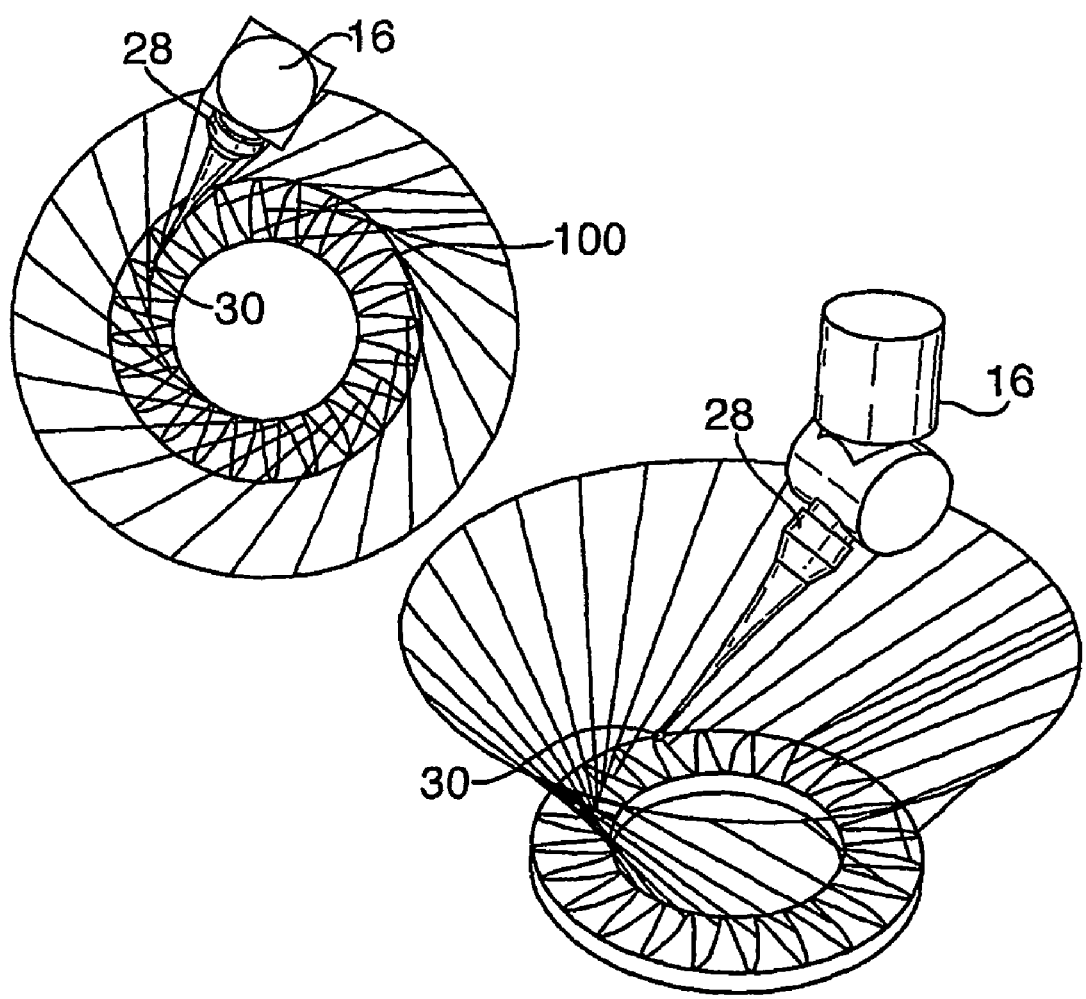
FIG. 12 illustrates an annular scan.

FIG. 11 illustrates a square 90 which is sweep scanned. In this case the probe 28 is lined up nominally in the direction of the CMM's movement. The four way-points 92,94,96,98 are at the corners the square.

If more way-points are introduced and the blend radius is sufficiently large, the quill will follow a continuously curved path. This allows the scanning of circular features, such as the annular scan 100 illustrated in FIG. 12.

Figure 13:
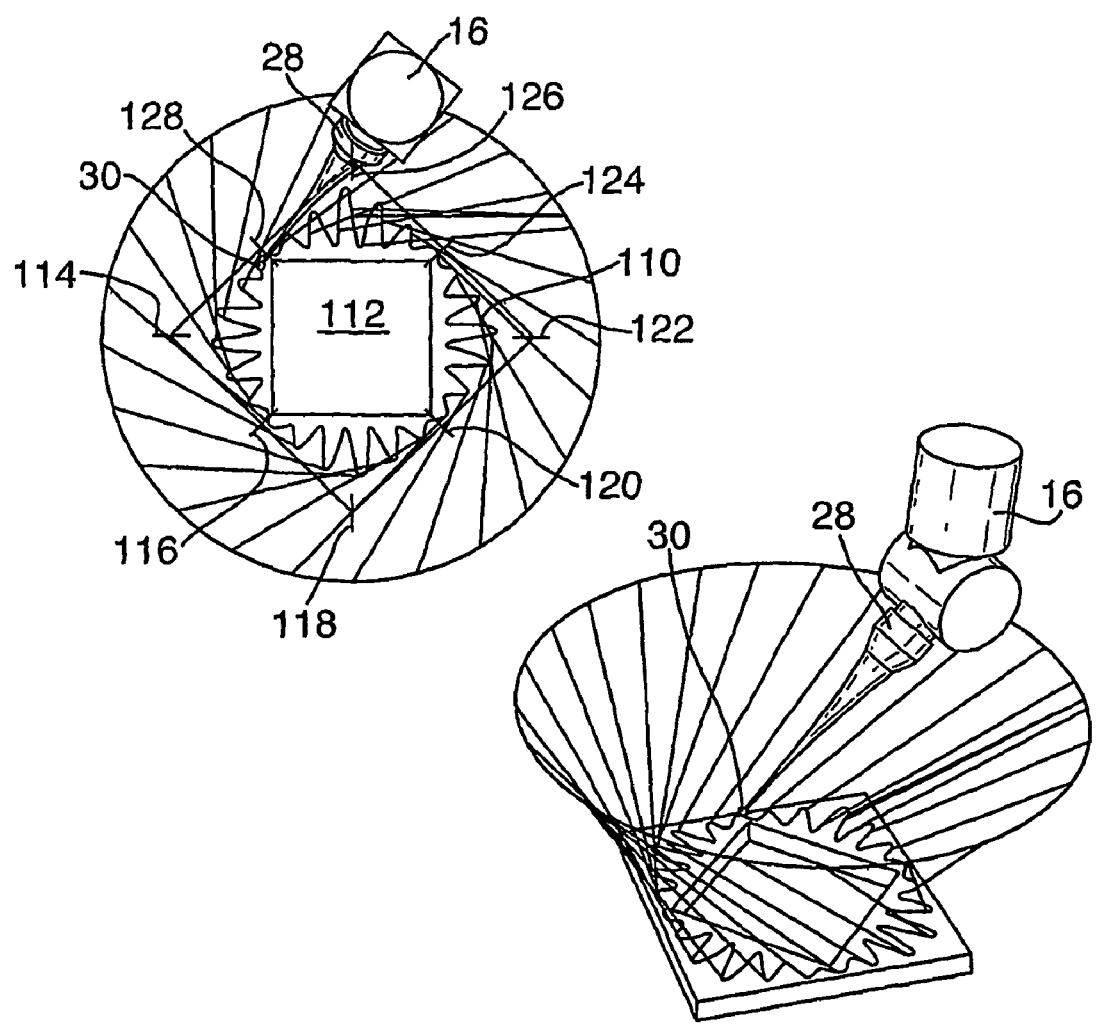
FIG. 13 illustrates the scan of an offset square hole in a square plate.

This method of blending segments of moves together enables even more complex shapes to be measured. FIG. 13 illustrates a square plate 110 with a square hole 112 offset at 45 degrees. As illustrated in FIG. 13, eight way-points 114-128 are used, with a large blend radius so that the CMM moves in a curved path. The width of the scan alternates between a maximum and minimum value and results in a pattern that covers the area very efficiently.

By varying the scan width and the number of way-points, a whole variety of offset shapes can be measured efficiently.

The blended scans described above are all in a single plane, the only movement out of the plane of the scan being due to a specified height in the parabola. It is also possible to specify a sequence of move segments where the surface normals are in different planes.

Figure 14:
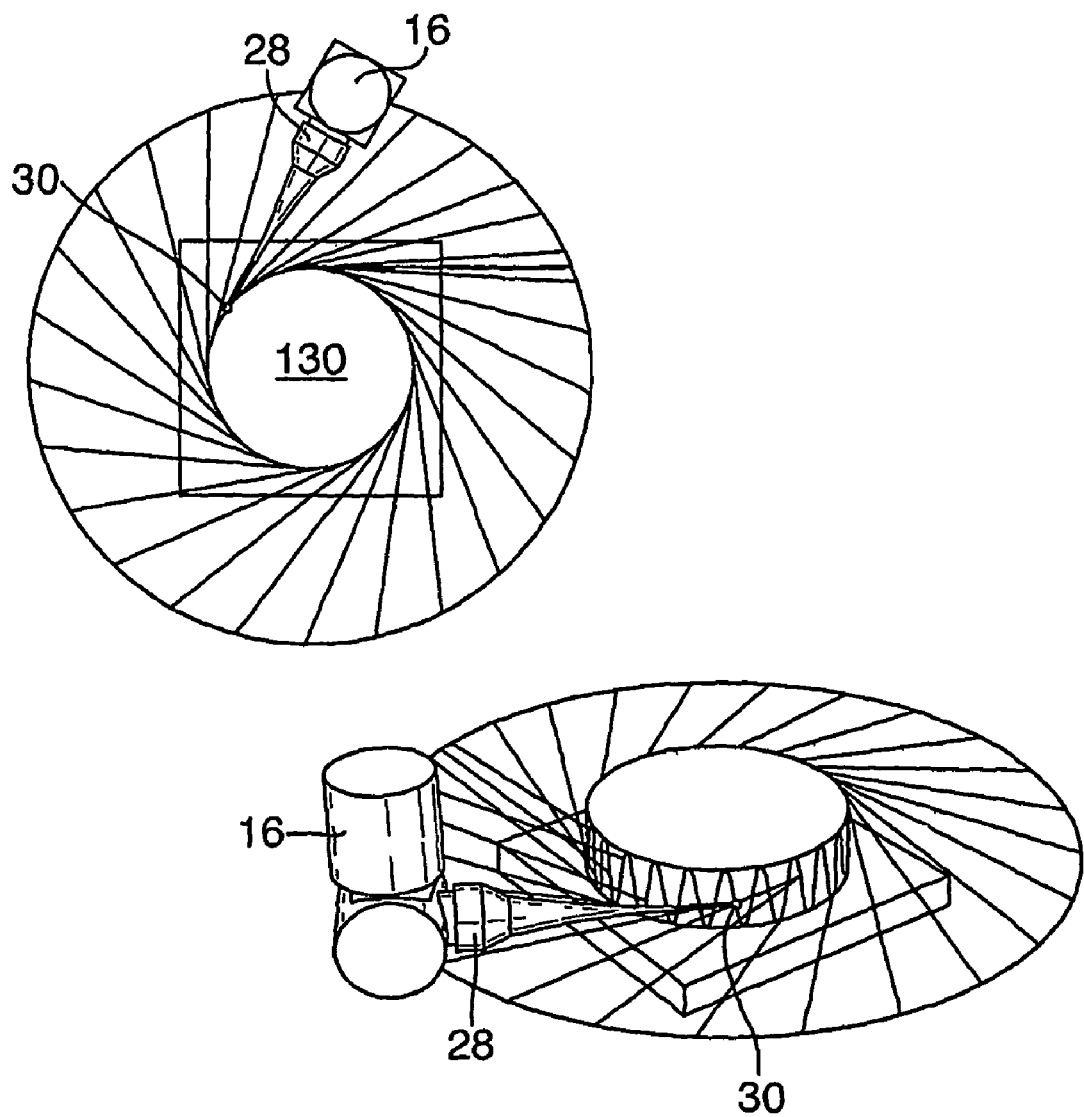
FIG. 14 illustrates the scan of a boss.

FIG. 14 illustrates a method of measuring a large cylinder or boss 130. The motorised scanning head orbits the centre of the boss at a large radius with the probe 28 close to the tangent to the perimeter of the cylinder whilst sweeping up and down. The probe is angled at an offset away from the tangent to avoid the problem of shanking out. The large circular orbit can be approximated by using a number of way-points blended with a large blend radius. In order for the sweep to move around the cylinder, the normal of each segment is set to be parallel to the line joining the axis of the cylinder and the nominal centre of the sweep.

In an alternative method of scanning a boss, a square profile can be used as the machine path. The corners of the square profile are preferably blended to reduce stopping time. This has the advantage that the machine can travel very quickly along a straight path due to zero acceleration at constant velocity (with the exception of the corners of the square profile where the velocity is ramped up and down). If the square profile has a larger diameter than the boss, then there will be duplication of the data at the corners, reducing errors where the acceleration is not constant. Furthermore the acceleration is tangential to the data points and thus does not adversely affect the metrology. This method has the advantage of faster scanning of a boss than the method illustrated in FIG. 14.

Figure 19:
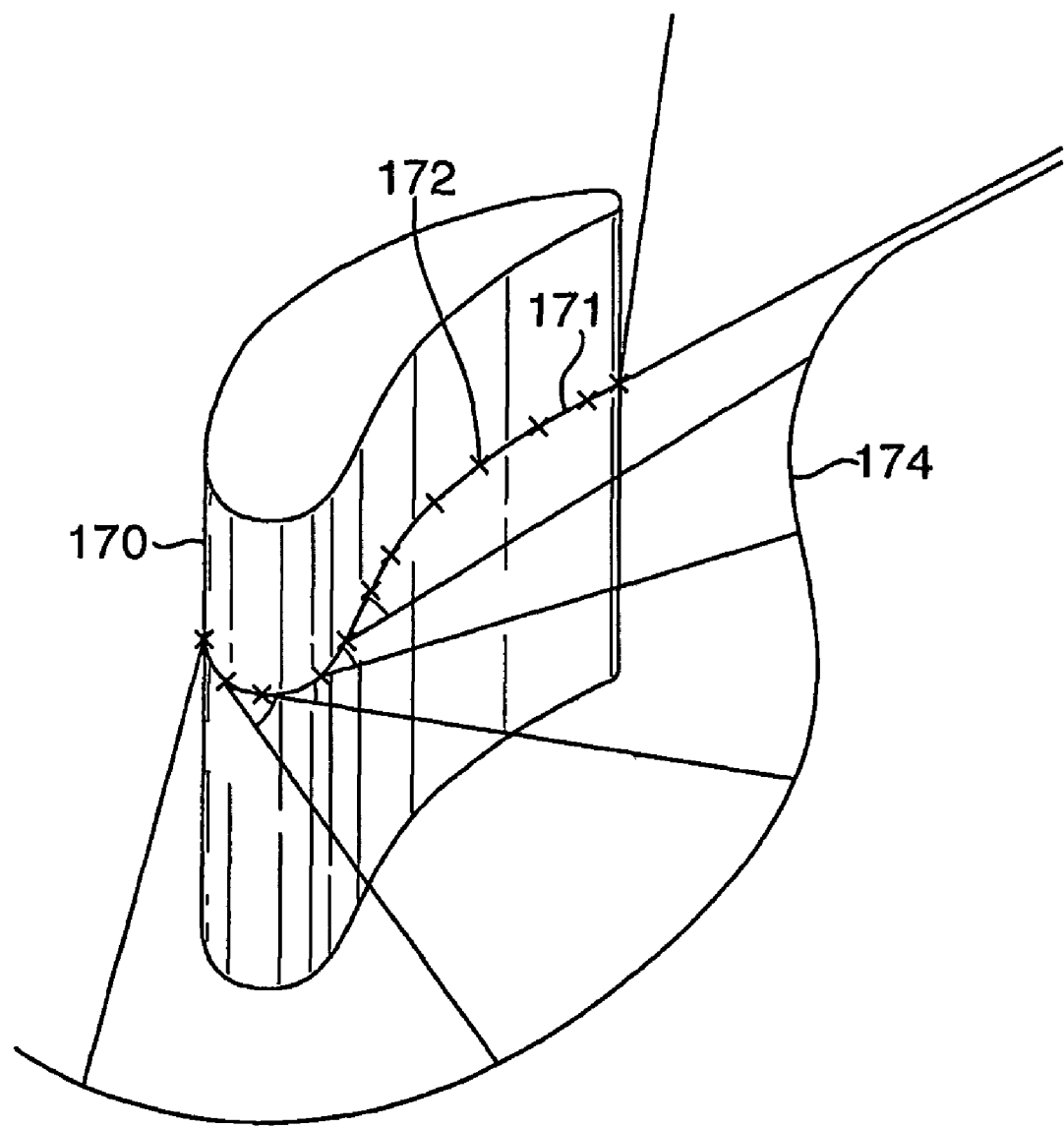
FIG. 19 illustrates the scan profile of an aerofoil using waypoints.

FIG. 19 illustrates a scan profile 171 of an aerofoil 170 which is created using a series of waypoints 172. The probe is angled close to a tangent of the surface to avoid collision between the probe and the part. The locus of the probe head 174 is determined accordingly. Several such scans may be carried out along the length of the aerofoil.

Figure 20:
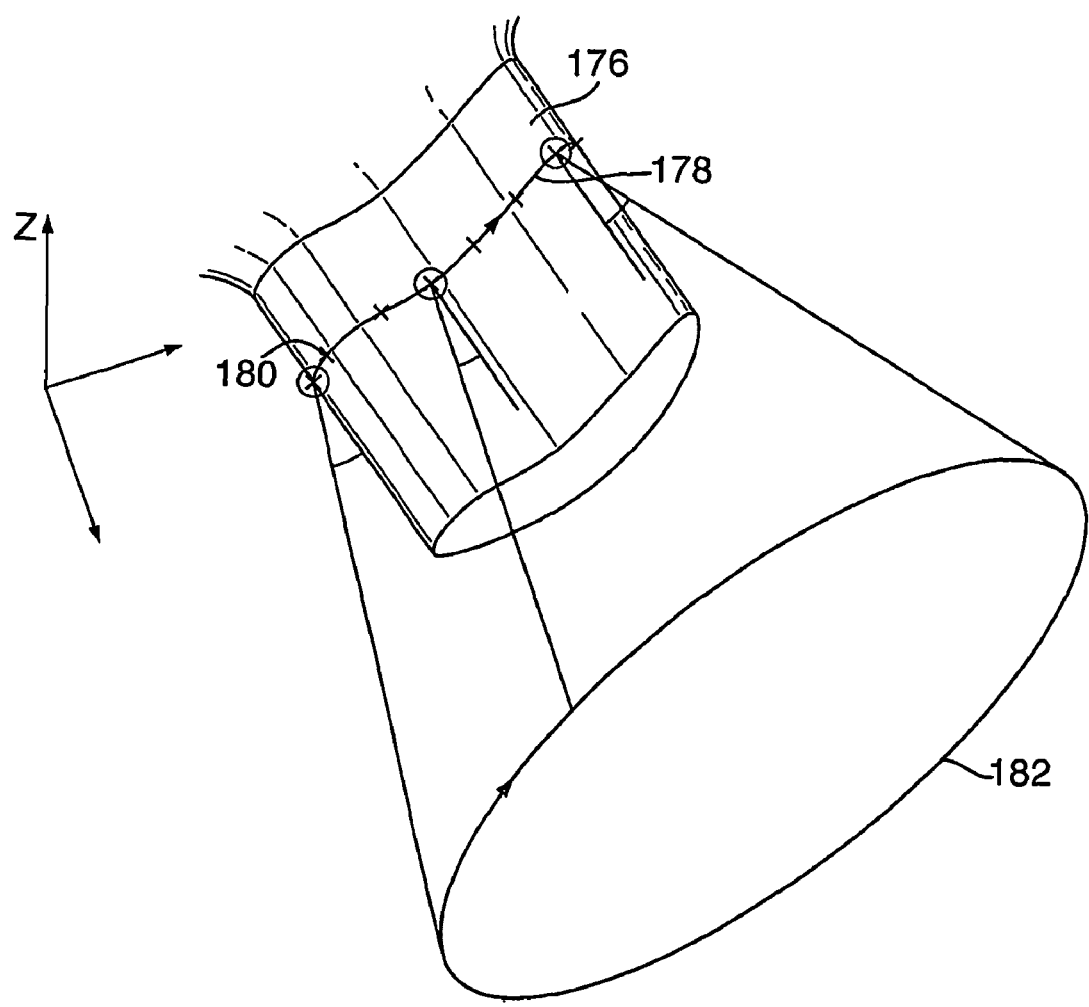
FIG. 20 illustrates the scan profile of a blisk using waypoints.

FIG. 20 illustrates a scan profile 178 of part of a blisk 176 which is likewise created using a series of waypoints 180. In this example the probe is angled at a small angle to the surface of a blade of the blisk, in the longitudinal direction, thus creating the locus of the probe head 182. As before, several such scans may be carried out along the length of the blisk.

This method of blending is not limited to surface measuring but is also suitable for free space moves, for complex movement of an apparatus in multiple axes.

Figure 15:
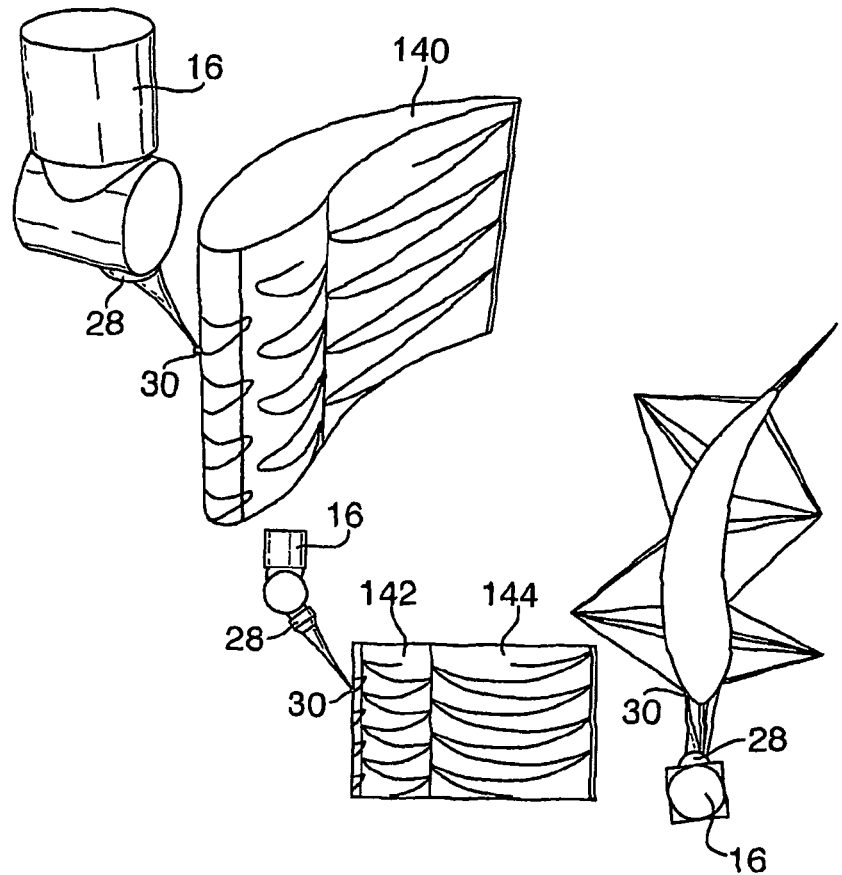
FIG. 15 illustrates the scan of an aerofoil.

As previously described, the parabola contains a height parameter which is important for some complex parts, such as an aerofoil 140, as illustrated in FIG. 15. The important features to be measured in an aerofoil are the leading and trailing edges. This method allows both the leading and trailing edges to be measured and also the faces of the aerofoil.

The aerofoil is split into different regions 142,144 etc using the methods described above with reference to FIGS. 6-8. Each region is then scanned. If the region has a uniform cross section from top to bottom, then the scan is straightforward and each region is easily scanned from top to bottom (or vice versa). However, if the region has a different profile at the top and bottom or if the aerofoil is orientated at an angle, then the scan profile will differ along the height of the region. In this case, the parabolas will need to be defined at the top, bottom and possibly in the middle of the region. The parameters of the parabolas are then blended to enable a single scan along the region. In this case the centre line (i.e. the path of the scanning head) and the normal are blended.

Access difficulties can occur with complex parts, for example aerofoils which are formed as part of a blade-disk (blisk). The centre of rotation of the head does not have to be over the centre of the sweep, so it is still possible to scan the important features of an aerofoil using the sweep scan. Two passes are made, one with the head over the hub where the outer leading edge is scanned and one with the head over the rim of the blisk where the inner leading edge is. This prevents the probe from shank out on the hub or rim.

Figure 16:
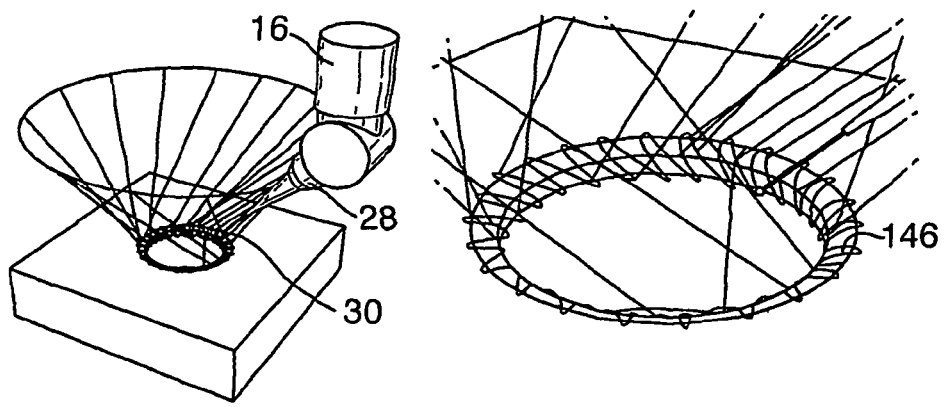
FIG. 16 illustrates the scan of a valve seat.

The parabolic method may also be used on compound curves. FIG. 16 illustrates a valve seat 146 which is curved in two dimensions.

The CMM follows a curved path generated by having way-points with large blend radii. The surface normals are rotated as the head orbits the valve seat, so that if vectors are drawn along them during the scan, they will form a cone centred on the valve seat, with a base the same diameter as the valve seat. The parabola height parameter is used to get the probe to trace a nominally curved path over the two conical faces of the valve seat.

The invention claimed is:

1. A method for measuring a surface profile using a surface sensing device mounted on a probe head, the probe head including a drive for producing rotational movement of the surface sensing device about one or more axes, the method comprising the following steps, in any suitable order:
   (a) moving the probe head along a nominal path relative to the surface profile;
   (b) approximating at least one section of the surface profile to a curved profile which is mathematically parameterized;
   (c) determining at least an approximation of a surface normal of the surface profile from the mathematically parameterized curved profile;
   (d) sensing the surface profile with the surface sensing device; and
   (e) adjusting a distance or force of the surface sensing device relative to the surface profile substantially in the direction of the surface normal.

2. A method according to claim 1 wherein the surface sensing device comprises a deflectable stylus and wherein the step of sensing the surface with the surface sensing device in step (d) comprises transducing a deflection of the stylus.

3. A method according to claim 1 wherein the surface sensing device comprises a stylus and wherein the step of sensing the surface with the surface sensing device in step (d) comprises transducing the force at the stylus.

4. A method according to claim 1 wherein the surface sensing device comprises a non contact probe and wherein the step of sensing the surface with the surface sensing device in step (d) comprises transducing the distance of the surface from the non contact probe.

5. A method of according to claim 1, wherein the adjustment step (e) is obtained through producing rotational movement of the surface sensing device about one or more axes.

6. A method according to claim 1, wherein the curved profile comprises a parameterized parabola.

7. A method for measuring a surface profile using a surface sensing device mounted on a probe head, the probe head including a drive for producing rotational movement of the surface sensing device about one or more axes, the method comprising the following steps, in any suitable order:
   (a) approximating at least one section of the surface profile to a curved profile which can be mathematically parameterized;
   (b) determining a surface normal of the at least one section of the curved profile from the mathematically parameterized curved profile; and
   (c) measuring a surface of the at least one section of the surface profile with the surface sensing device, wherein a distance or force reported by the surface sensing device is controlled in substantially the direction of the surface normal of the curved profile.

8. A method according to claim 7 wherein the curved profile comprises a parameterized parabola.

9. A method according to claim 7 wherein the curved profile has defined height and width parameters.

10. A method according to claim 9 wherein the curved profile has different height and width parameters at a start and an end of the at least one section, the height and width parameters being merged together between the start and the end.

11. A method according to claim 7 wherein a nominal scan path of the surface sensing device is created by superimposing a wave over the curved profile.

12. A method according to claim 7, wherein two or more sections of the surface profile are approximated to a corresponding number of curved profiles.

13. A method according to claim 12 wherein the two or more sections are selected so that each region curves in only one direction.

14. A method according to claim 12 wherein points of inflection of the surface profile are selected as boundaries of the two or more sections.

15. A method according to claim 12 wherein measurement profiles of the two or more curved profiles are blended together.

16. A method according to claim 7 wherein the parameters are adjusted so they better approximate the surface profile.

17. An Apparatus An apparatus for measuring a surface profile with a surface sensing device mounted on a probe head on a coordinate positioning apparatus, wherein the coordinate positioning apparatus may be operated to produce relative movement between the probe head and the surface profile and wherein the probe head includes a drive for producing rotational movement of the surface sensing probe about one or more axes, the apparatus comprising a controller configured to carry out the following steps, in any suitable order:
   (a) moving the probe head along a nominal path relative to the surface profile;
   (b) approximating at least one section of the surface profile to a curved profile which is mathematically parameterized;
   (c) determining at least an approximation of a surface normal of the surface profile from the mathematically parameterized curved profile;
   (d) sensing the surface with the surface sensing device; and
   (e) adjusting a distance or force of the surface sensing device relative to the surface substantially in the direction of the surface normal.

18. An apparatus according to claim 17, wherein the curved profile comprises a parameterized parabola.

19. An apparatus for measuring a surface profile using a surface sensing device mounted on a probe head on a coordinate positioning apparatus, wherein the coordinate positioning apparatus may be operated to produce relative movement between the probe head and the surface profile and wherein the probe head includes a drive for producing rotational movement of the surface sensing device about one or more axes, the apparatus comprising a controller for carrying out the following steps, in any suitable order:

(a) approximating at least one section of the surface profile to a curved profile which can be mathematically parameterized;

(b) determining a surface normal of the at least one section of the curved profile from the mathematically parameterized curved profile;

(c) measuring the surface of the at least one section of the surface profile with the measurement probe and wherein a distance or force reported by the surface sensing device is controlled in substantially the direction of the normal of the curved profile.

20. An apparatus according to claim 19, wherein the curved profile comprises a parameterized parabola.

* * * * *